(12) United States Patent
Xie et al.

(10) Patent No.: US 9,859,965 B2
(45) Date of Patent: Jan. 2, 2018

(54) TELECOMMUNICATION TERMINAL

(71) Applicant: Fortinet, Inc., Sunnyvale, CA (US)

(72) Inventors: Michael Xie, Palo Alto, CA (US); Koroush Akhavan-Saraf, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 14/287,424

(22) Filed: May 27, 2014

(65) Prior Publication Data

US 2015/0351156 A1 Dec. 3, 2015

(51) Int. Cl.
*H04M 1/00* (2006.01)
*H04B 7/06* (2006.01)
*H04M 1/253* (2006.01)
*H04M 1/247* (2006.01)

(52) U.S. Cl.
CPC ........ *H04B 7/0617* (2013.01); *H04M 1/2473* (2013.01); *H04M 1/2478* (2013.01); *H04M 1/2535* (2013.01)

(58) Field of Classification Search
CPC .................................................. H04W 80/04
USPC .............................. 455/560, 41.1, 41.2, 41.3
See application file for complete search history.

(56) References Cited

U.S. PATENT DOCUMENTS

| | | | |
|---|---|---|---|
| 7,263,362 B1* | 8/2007 | Young | H04L 12/2856 370/338 |
| 2004/0132485 A1* | 7/2004 | Charney et al. | 455/552.1 |
| 2004/0258021 A1* | 12/2004 | Kashimoto | H04L 29/06027 370/331 |
| 2004/0259544 A1* | 12/2004 | Amos | 455/435.1 |
| 2005/0048919 A1* | 3/2005 | Jeannerod | 455/41.2 |
| 2005/0063399 A1* | 3/2005 | Zaitsu | H04L 12/2856 370/401 |
| 2006/0058003 A1* | 3/2006 | Lee | 455/403 |
| 2007/0180435 A1* | 8/2007 | Hunteler | G06F 9/5016 717/136 |
| 2011/0032849 A1* | 2/2011 | Yeung et al. | 370/280 |
| 2013/0155170 A1* | 6/2013 | Eichen | H04W 76/02 348/14.02 |
| 2014/0287690 A1* | 9/2014 | Kim | 455/41.3 |

* cited by examiner

*Primary Examiner* — Wen Huang
(74) *Attorney, Agent, or Firm* — Hamilton, DeSanctis & Cha LLP

(57) ABSTRACT

A telecommunication terminal that integrated with a wireless access point is provided. According to one embodiment, a telecommunication terminal comprising a phone unit, a wireless access point unit, a local area network (LAN) port that is capable of connecting to a computer network and a housing that encloses said phone unit, said wireless access point unit and said LAN port.

7 Claims, 7 Drawing Sheets

TELECOMMUNICATION TERMINAL

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014, Fortinet, Inc.

BACKGROUND

Field

Embodiments of the present invention generally relate to the field of communication techniques. In particular, various embodiments relate to a telecommunication terminal that is integrated with a wireless access point (AP).

Description of the Related Art

Usually, in an office area, each cubicle is equipped with a phone set. The phone set may be a traditional telephone that is connected to a public switched telephone network (PSTN) through a telephone line. If the phone set is an Internet Protocol (IP) phone, the IP phone is connected to a computer network through a local area network (LAN) cable and then connected to a PSTN through the computer network. An office area is also provided with a wireless LAN (WLAN) connection. To provide Wi-Fi (IEEE 802.11x.) coverage, one or more wireless APs may be deployed. Typically, the wireless APs are connected to a switch or an AP controller through an Ethernet cable. To provide a better coverage, a wireless AP is usually mounted on the ceiling of the office area and a long Ethernet cable across the ceiling is needed to connect the AP with a switch. As mounting of APs and cables on a ceiling is time-consuming and labor-consuming, there is a need for an integrated network appliance to simplify the deployment of wireless APs.

SUMMARY

A telecommunication terminal is described for combining a phone set with a wireless AP to provide telephone service and WLAN service by the same device. According to one embodiment, a telecommunication terminal comprising a phone unit, a wireless access point unit, a local area network (LAN) port that is capable of connecting to a computer network and a housing that encloses said phone unit, said wireless access point unit and said LAN port. Only one cable is needed for connecting the telecommunication terminal to the computer network and telephone network. Wireless APs may be deployed easily and flexibly at desired place without deploying additional cables. Construction works for mounting the APs on the ceiling are omitted and the costs for mounting APs are significantly lowered. Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
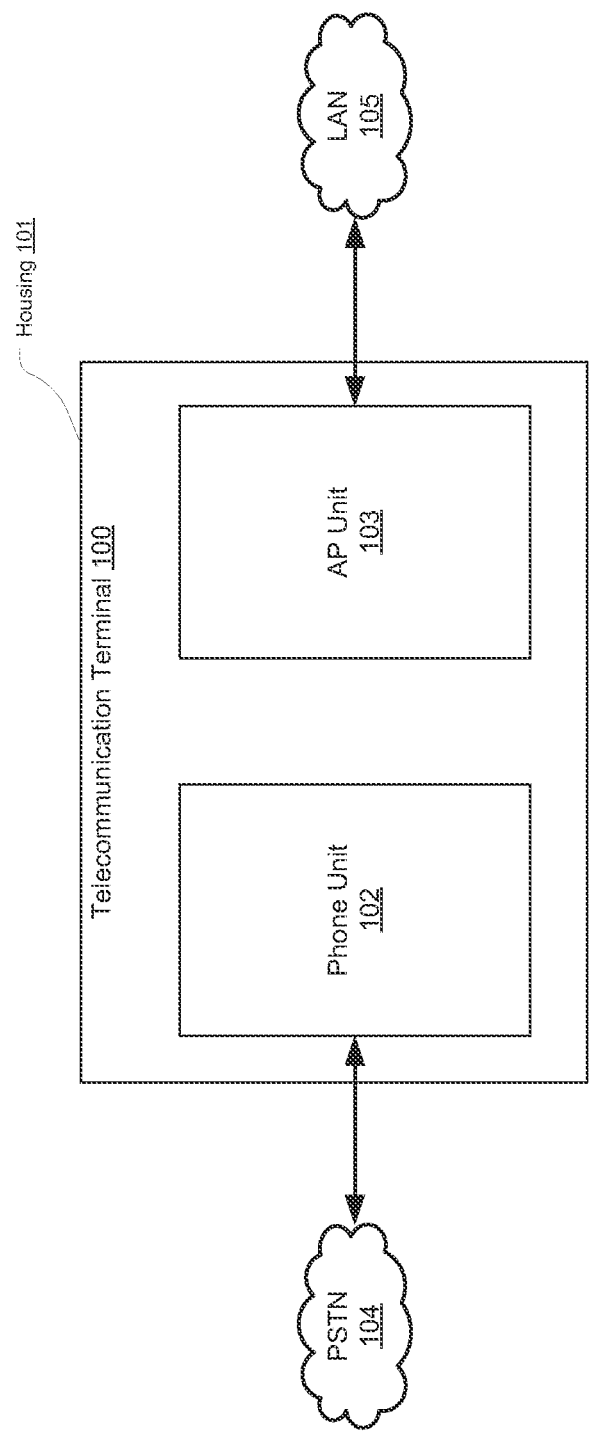
FIG. 1 illustrates exemplary functional units of a telecommunication terminal in accordance with a first embodiment of the present invention.

A telecommunication terminal is described for combining a phone set with a wireless access point so that mounting of the wireless access point is omitted and deployment of the wireless AP is simplified. For example, an IP phone set may be integrated with a wireless AP and share the same LAN cable and the wireless AP may be deployed at the desktop where the IP phone is located. Further, a keypad and a display of the IP phone may be shared with the wireless AP so that the wireless AP may be configured locally at the device.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

The phrase "networking appliance" generally refers to a specialized or dedicated device for use on a network in virtual or physical form. Some networking appliances are implemented as general-purpose computers with appropriate software configured for the particular functions to be provided by the networking appliance; others include custom hardware (e.g., one or more custom Application Specific Integrated Circuits (ASICs)). Examples of functionality that may be provided by a networking appliance include, but is not limited to, Layer 2/3 routing, content inspection, content filtering, firewall, traffic shaping, application control, Voice over Internet Protocol (VoIP) support, VPN, Internet Protocol (IP) security (IPSec), Secure Sockets Layer (SSL), antivirus, intrusion detection, intrusion prevention, Web content filtering, spyware prevention and anti-spam. Examples of networking appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phase "security device" generally refers to a hardware device or appliance configured to be coupled to a network and to provide one or more of data privacy, protection, encryption and security. The network security device can be a device providing one or more of the following features: network firewalling, Virtual Private Networking (VPN), antivirus, IPS, content filtering, data leak prevention, antispam, antispyware, logging, reputation-based protections, event correlation, network access control, vulnerability management, load balancing and traffic shaping—that can be deployed individually as a point solution or in various combinations as a UTM solution. Non-limiting examples of network security devices include proxy servers, firewalls, VPN appliances, gateways, UTM appliances and the like.

FIG. 1 illustrates exemplary functional units of a telecommunication terminal 100 in accordance with a first embodiment of the present invention. In the first embodiment, a traditional PSTN telephone set is combined with a wireless access point. The telecommunication terminal 100 of FIG. 1 comprises a phone unit 102 and a wireless AP unit 103. Phone unit 102 and wireless AP unit 103 are contained in a common housing 101. Phone unit 102 connects to a PSTN 104 through a telephone port and wireless AP unit 103 connects to LAN 105 through a LAN port. In some embodiments, all the hardware of the two units remain separate and the two units may operate independently. In other embodiments, phone unit 102 and wireless AP unit 103 may operate independently but share a few common parts, such as power units. By integrating a wireless AP into a telephone set, the wireless access point may be easily deployed at the place where the telephone set is located and the time-consuming and labor-intensive installation process of mounting wireless APs on the ceiling may be omitted.

Figure 2:
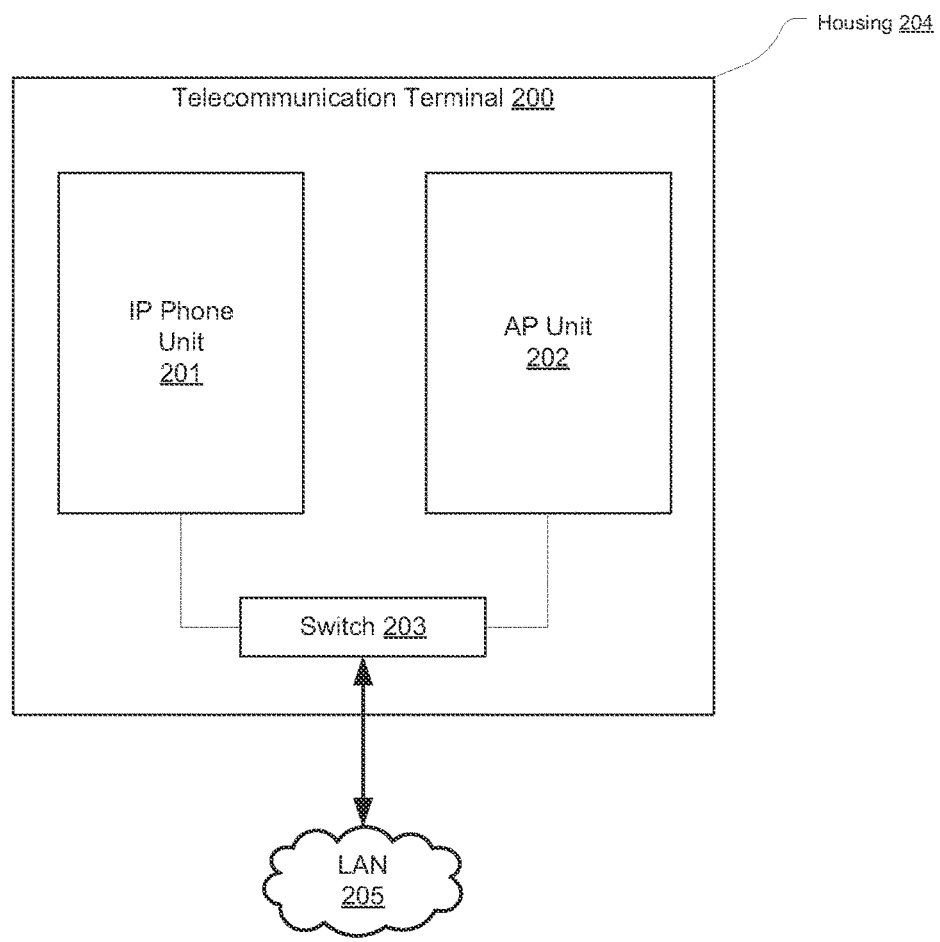
FIG. 2 illustrates exemplary functional units of a telecommunication terminal in accordance with a second embodiment of the present invention.

FIG. 2 illustrates exemplary functional units of a telecommunication terminal 200 in accordance with a second embodiment of the present invention. In the second embodiment, an IP phone is combined with a wireless access point and hardware and operations of the two devices are independent. Telecommunication terminal 200 comprises an IP phone unit 201 and a wireless AP unit 202. The two units are contained in a common housing 204. In one embodiment, IP phone unit 201 and AP unit 202 connect to a computer network, such as LAN 205, through respective LAN ports. These two units may comprise respective network interface cards (NICs) and connect to LAN 205 through two cables. However, to simplify the connection and reduce the number of cables that are need to connect telecommunication terminal 200, a switch 203 may be integrated into telecommunication terminal 200. One port of switch 203 connects to LAN 205 through one cable and then IP phone unit 201 and wireless AP unit 202 connect to other ports of switch 203 so that the same cable may be shared by the two units. It will be apparent to one skilled in the art that a hub or a router, instead of switch 203, may be used for sharing the same cable between IP phone unit 201 and wireless AP unit 202. By connecting the telecommunication terminal 200 to a LAN jack on the wall, a wireless access point may be easily deployed at desired place, again, without incurring the time-consuming and labor-intensive installation process of mounting wireless APs on the ceiling. The hardware structures of IP phone unit 201 and AP 202 unit that may be used in embodiments of the present invention will be described in detail below with reference to FIGS. 3 and 4.

Figure 3:
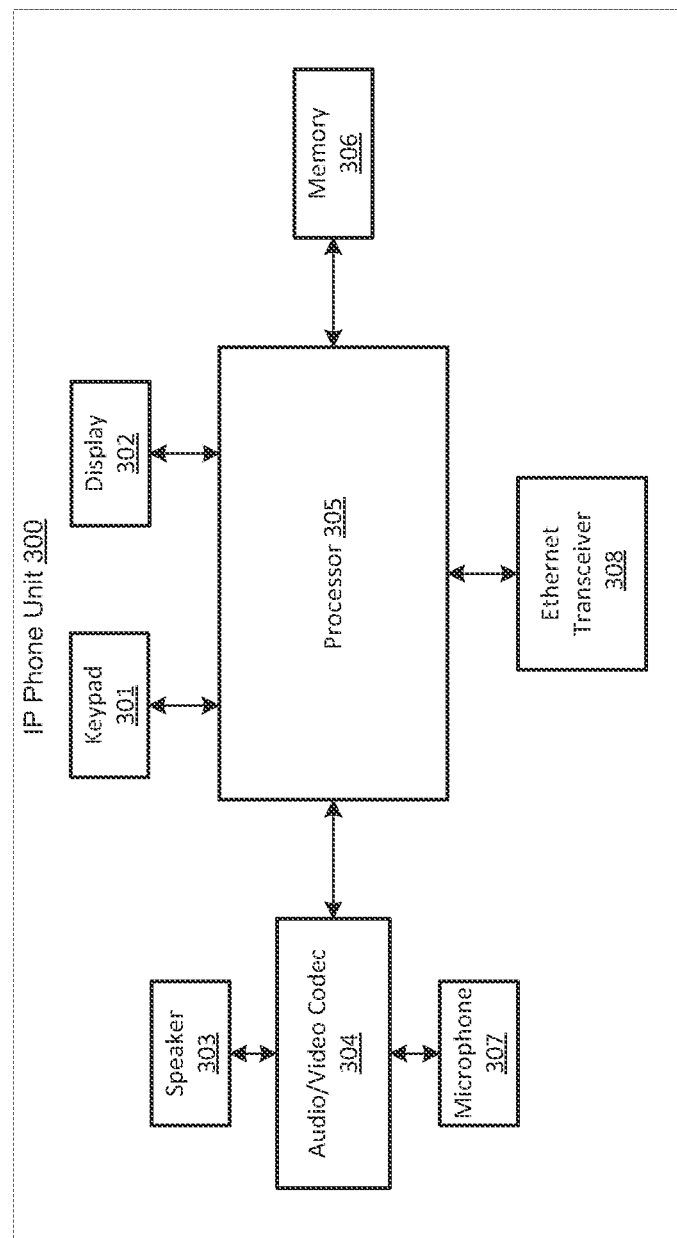
FIG. 3 illustrates exemplary functional units of an IP phone set in accordance with an embodiment of the present invention.

FIG. 3 illustrates exemplary hardware units of an IP phone set in accordance with an embodiment of the present invention. IP phone unit 300 comprises a keypad 301, a display 302, a speaker 303, an audio/video codec 304, a microphone 307, a processor 305, a memory 306 and an Ethernet transceiver 308. IP phone unit 300 of FIG. 3 may implement audio/video communication through IP network.

Processor 305 executes call control based on call control protocols, such as Session Initiation Protocol (SIP) or H.323. Processor 305 also provides necessary instructions to keypad 301, display 302, audio/video codec 304 and Ethernet transceiver 308. It will be apparent to one skilled in the art that processors from manufacturers, such as Intel, AMD, ARM, or the like may be used.

Memory 306 may include Read Only Memory (ROM) and Random Access Memory (RAM) functions. Some portions of the ROM may store an operating system and others may store such programs as the program for controlling communication, which is executed by processor 305. A RAM functions as a work memory when processor 305 executes the control program.

Speaker 303, audio/video codec 304 and microphone 307 usually consist of a handset that may be connected to processor 305. The handset may send an off-hook or on-hook signal depending on the user's on-or-off hook operation. When starting communication with the destination terminal, audio/video codec 304 converts the user's voice into a transmitting audio signal through the microphone and outputs the signal to processor 305. At the same time, audio/video codec 304 outputs, through the speaker, a receiving voice signal input by processor 305, as a receiving voice. A camera may also be incorporated into IP phone unit 300 so that the user's image may be captured and transmitted. The video signal received by IP phone unit 300 may also be decoded and displayed on display 302.

Display 302 is used for displaying the status of operations of IP phone unit 300, such as the incoming/outgoing call numbers, the call history, contacts in phone book etc. Display 302 may also display video received from the communication peer or captured by the camera of IP phone unit 300. Display 302 is configured with an LCD or the like.

Ethernet transceiver 308 is an interface to an IP network to which IP phone is connected. Ethernet transceiver 308 is used for receiving and sending data packets from/to the IP network. It will be apparent to one skilled in the art that Ethernet transceiver 308 may be any kind of Ethernet transceiver that supports 10/100/1000 Mbps or higher operations.

Figure 4:
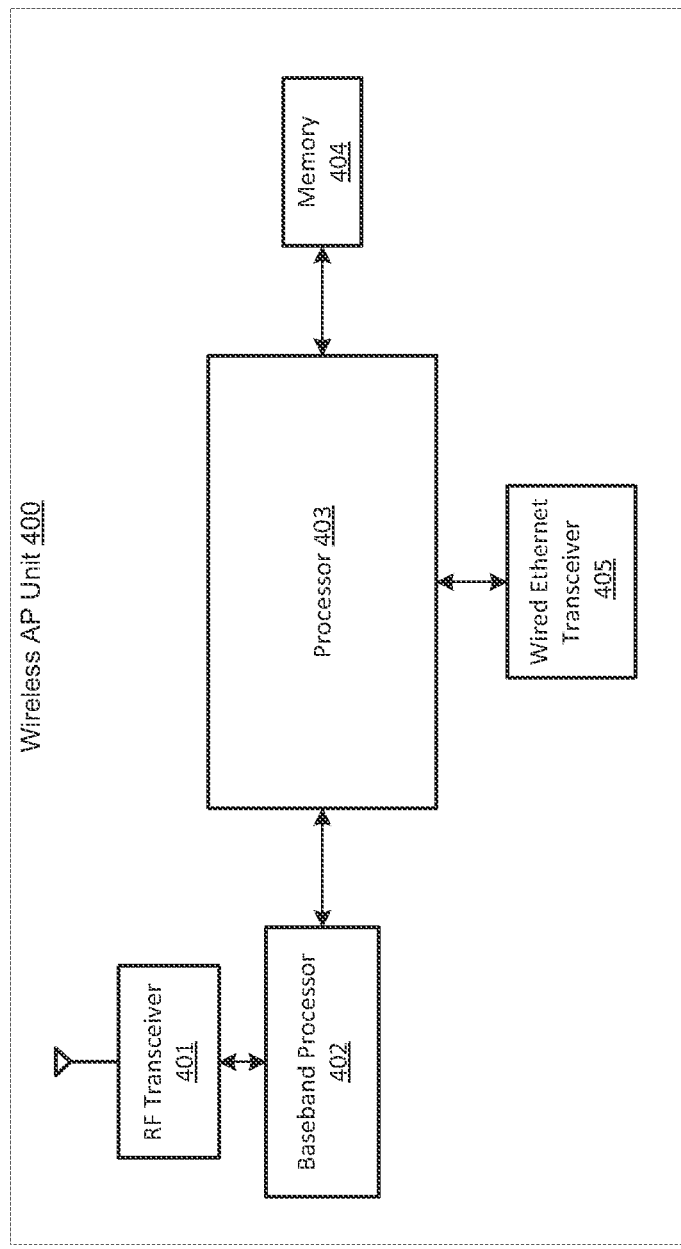
FIG. 4 illustrates exemplary functional units of a wireless AP in accordance with an embodiment of the present invention.

FIG. 4 illustrates exemplary hardware units of a wireless AP in accordance with an embodiment of the present invention. Wireless AP unit 400 may connect to a computer network and provides wireless connections to other Wi-Fi-enabled devices within its coverage so that these Wi-Fi-enabled devices may access the computer network. Wireless AP unit 400 comprises processor 403, memory 404, Ethernet transceiver 405, baseband processor 402 and RF transceiver 401.

Processor 403 controls the operations of wireless AP unit 400 that relays data between connected wireless devices to a connected wired Ethernet switch. A tunnel, such as a Control and Provisioning of Wireless Access Points (CAPWAP) tunnel, may also be established between wireless AP unit 400 and an AP controller (not shown) so that wireless AP unit 400 may be managed from a remote point in a secure manner. Layer 2 (L2) and Layer 3 (L3) applications may be loaded from memory 404 and executed by processor 403. It will be apparent to one skilled in the art that processors from manufacturers, such as Intel, AMD, ARM, or the like may be used.

Baseband processor 402 is used for carrying out baseband processing on data received or to be sent by radio frequency (RF) transceiver 401. Baseband processor 402 may be a chip that manages all the radio function of wireless AP unit 400.

RF transceiver 401 may provide, on a single semiconductor integrated circuit, a receiver circuit for each of a plurality of antennas and a transmit circuit for each of the plurality of antennas. Each receiver circuit downconverts the RF signal detected by its associated antenna to a baseband signal and each transmit circuit upconverts a baseband signal to be transmitted by an assigned antenna.

Wired Ethernet transceiver 405 serves as an interface with a LAN to which wireless AP unit 400 is connected. Ethernet transceiver 405 connects to the LAN through a wired connection so that the devices connected to wireless AP unit 400 through wireless channels may share the wired connection. Data packets between the wireless connected device and the LAN may be transferred through wired Ethernet transceiver 405.

It will apparent to one skilled in the art that the units providing wireless connection (such as RF transceiver 401, baseband processor 402) and the units providing wired connection may be integrated into one chip to provide a highly integrated solution for wireless AP unit 400.

Figure 5:
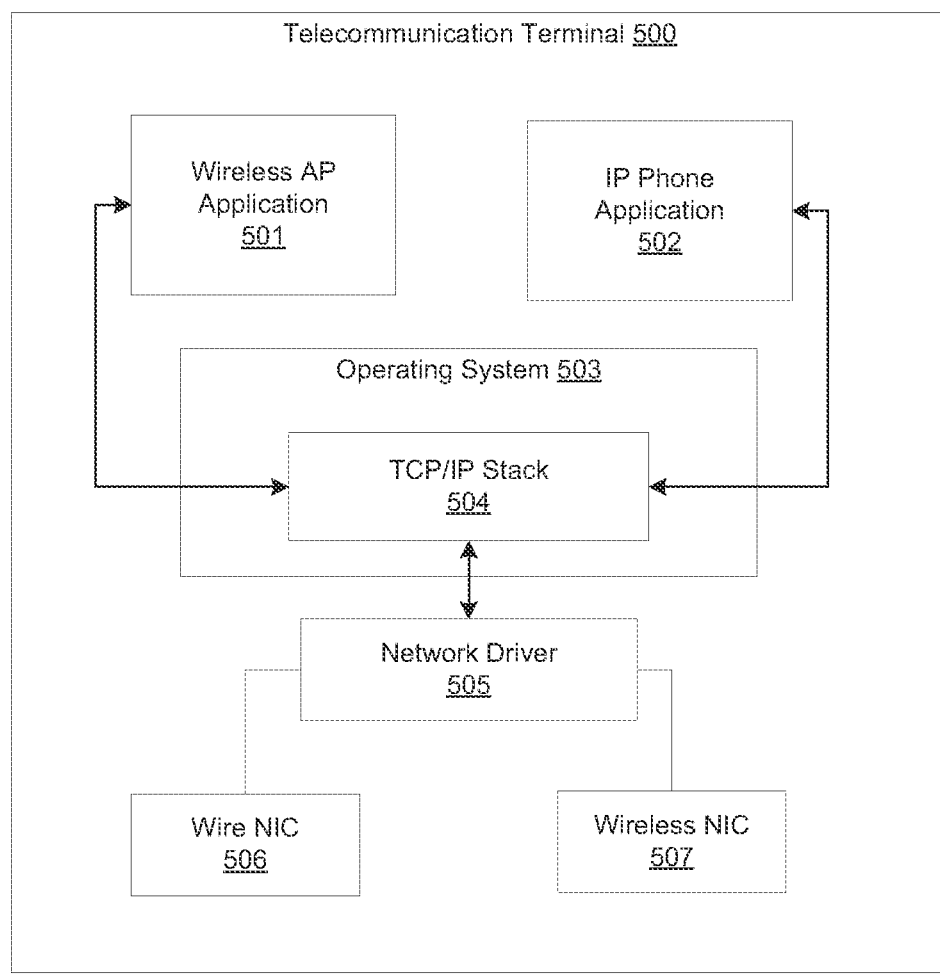
FIG. 5 illustrates exemplary functional units of a telecommunication terminal in accordance with a third embodiment of the present invention.

FIG. 5 illustrates an exemplary software structure of a telecommunication terminal in accordance with a third embodiment of the present invention. In the third embodiment, IP phone functions and wireless AP functions are implemented in a single operating system. The integrated device 500 shown in FIG. 5 comprises a wireless AP application 501, an IP phone application 502, an operating system 503, a Transmission Control Protocol (TCP)/IP layer 504, a network driver 505, a wired NIC 506 and a wireless NIC 508.

In the present embodiment, wired NIC 506 performs Ethernet physical and MAC layer functions. Wired NIC 506 may include, for example, an Ethernet NIC (or transceiver as shown in FIGS. 3 and 4) for transmitting information over an Ethernet cable. Wireless NIC 116 may include a WLAN NIC or WLAN transceiver (as shown in FIG. 4) for transmitting and receiving information via a WLAN wireless link.

Operating system 503 is used for managing the hardware and software resources of integrated device 500 and providing basic functions to applications of integrated device 500. The operating system 503 may be a built-in operating system, such as WINDOWS, LINUX, Darwin, RTXC, UNIX, OS X, or VxWorks. Operating system 503 may load network driver 505 that couples a networking protocol layer (such as TCP/IP layer 504) with the network interface cards of integrated device 500. Network driver 505 is preferably implemented in accordance with standard interface specifications, such as Open Data-Link Interface (ODI) and the Network Driver Interface Specification (NDIS). Network driver 505 may convert airwave data into wired Ethernet data, acting as a bridge between the wired LAN and wireless clients.

Wireless AP application 501 is used for managing wireless AP functions of integrated device 500. The administrator may configure the AP through the wireless AP application 501, such as adjusting the power or beam-forming parameters of antennas through an antenna controller. In other embodiments, the functions of wireless AP application 501 may be implemented as a daemon or even be implemented in the kernel of operating system 503.

In various embodiments, interference reduction software algorithms may also be implemented within or separate from wireless AP application 601 to, among other things, detect the best radio channel and power to avoid/reduce co-channel interference among multiple telecommunication terminals. The locations, configuration and/or arrangement of telecommunication terminals within an enterprise location may also be performed in a manner that allows optimum utilization of available radio channels and have lower channel interference for a given coverage area. Depending upon the particular implementation, automated interference reduction methodologies may be performed autonomously by individual telecommunication terminals, collectively, with cooperation among multiple telecommunication terminals or centrally by an interference management device, for example.

IP phone application 502 is used for providing Voice over IP (VoIP) phone functions based on corresponding VoIP protocols, such as SIP, H.323 and the like. IP phone application 502 facilitates communication with the network for receiving and placing communication calls and transfers audio/video signals between the integrated device 500 and another peer.

Figure 6:
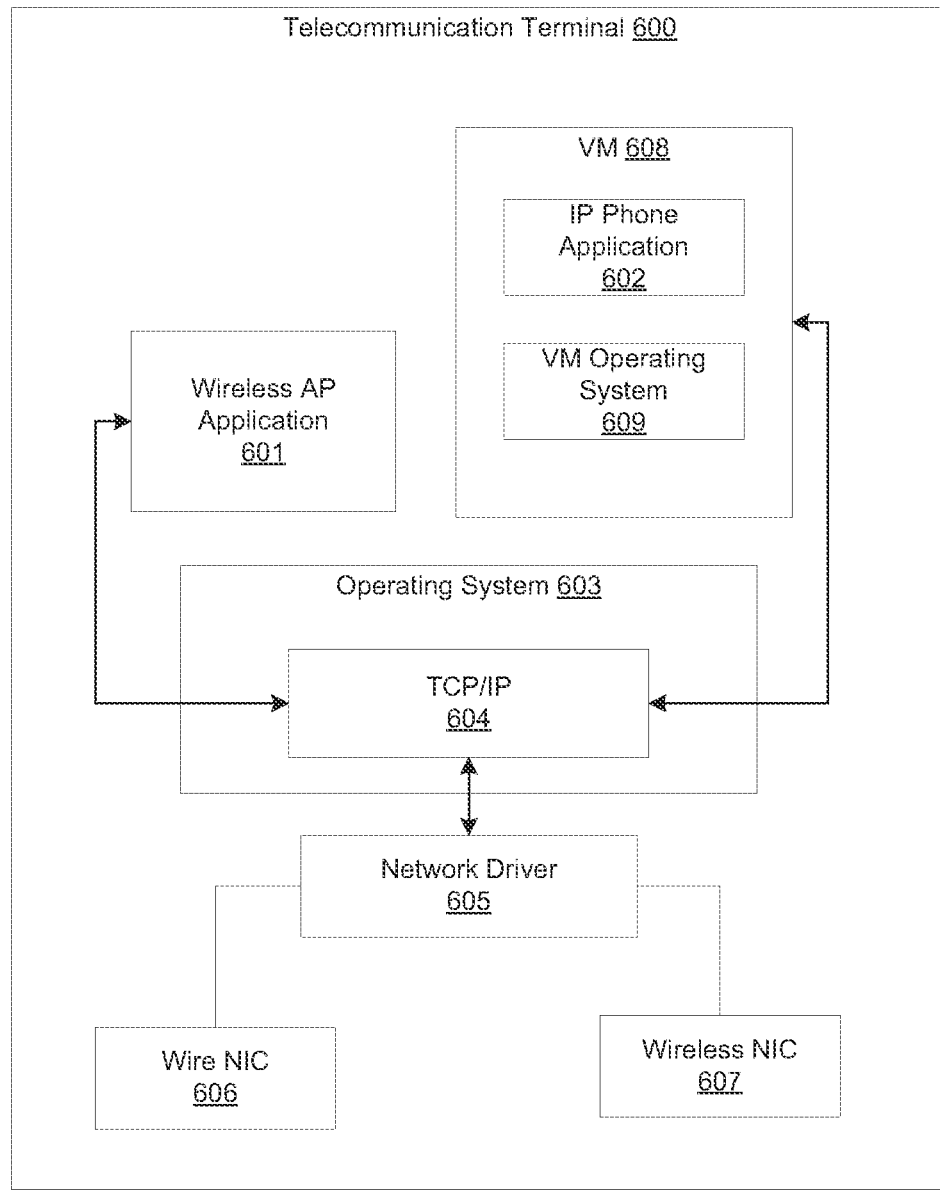
FIG. 6 illustrates exemplary functional units of a telecommunication terminal in accordance with a fourth embodiment of the present invention.

FIG. 6 illustrates an exemplary software structure of a telecommunication terminal in accordance with a fourth embodiment of the present invention. In the fourth embodiment, IP phone functions and wireless AP functions are implemented in a single system, but one application runs in a host system while the other runs in a virtual machine (VM) system. Integrated device 600 shown in FIG. 6 comprises a wireless AP application 601, an operating system 603, a TCP/IP layer 604, a network driver 605, a wired network interface card (NIC) 606 and a wireless NIC 607. These units are the same as the corresponding units in the third embodiment shown in FIG. 5.

In this embodiment, wireless AP application 601 may be configured to be loaded and run in the host system, i.e., operating system 603. VM 608 is hosted by operating system 603 and VM operating system 609 may be configured to run on VM 608 and IP phone application 602 may be configured to run in VM operating system 609. It is to be understood, in alternative embodiments, IP phone application 602 may be configured to run in the host system while wireless AP application 601 may be configured to run in the VM.

Figure 7:
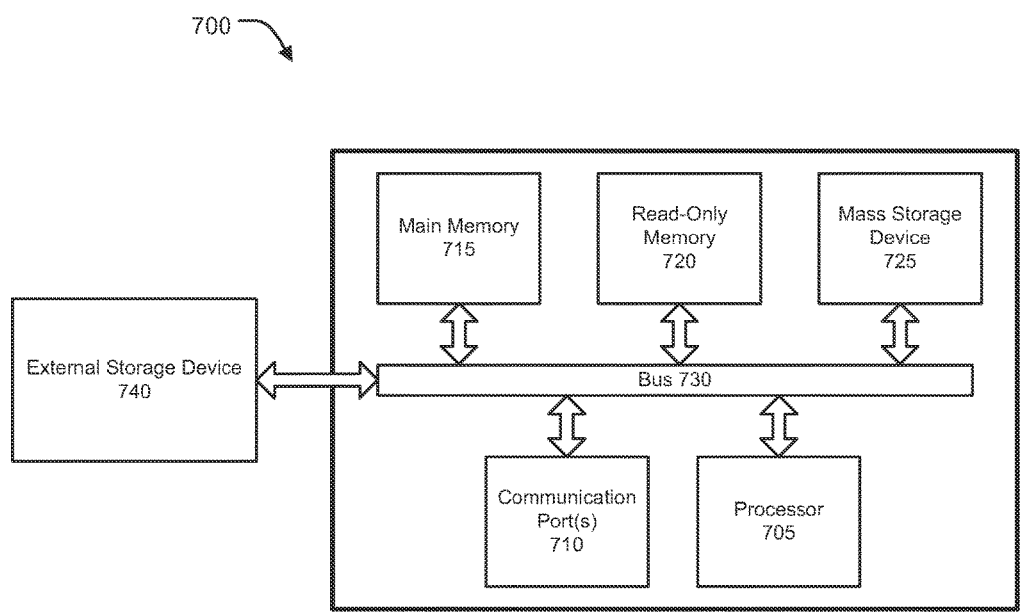
FIG. 7 is an exemplary computer system in which or with which embodiments of the present invention may be utilized.

FIG. 7 is an exemplary computer system in which or with which embodiments of the present invention may be utilized. Computer system 700 may represent or form a part of a security device that performs human user verification when a high risk network access is captured.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 700 includes a bus 730, a processor 705, communication port 710, a main memory 715, a removable storage media 740, a read only memory 720 and a mass storage 725. A person skilled in the art will appreciate that computer system 700 may include more than one processor and communication ports.

Examples of processor 705 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 705 may include various modules associated with monitoring unit as described in FIGS. 2-4. Communication port 710 can be any of an RS-232 port for use with a modem based dialup connection, a 10/100 Ethernet port, a Gigabit or 10 Gigabit port using copper or fiber, a serial port, a parallel port, or other existing or future ports. Communication port 710 may be chosen depending on a network, such a Local Area Network (LAN), Wide Area Network (WAN), or any network to which computer system 700 connects.

Memory 715 can be Random Access Memory (RAM), or any other dynamic storage device commonly known in the art. Read only memory 720 can be any static storage device(s) such as, but not limited to, a Programmable Read Only Memory (PROM) chips for storing static information such as start-up or BIOS instructions for processor 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 705 to system memory.

Optionally, operator and administrative interfaces, such as a display, keyboard, and a cursor control device, may also be coupled to bus 730 to support direct operator interaction with computer system 700. Other operator and administrative interfaces can be provided through network connections connected through communication port 710.

Removable storage media 740 can be any kind of external hard-drives, floppy drives, IOMEGA® ZIP Drives, Compact Disc-Read Only Memory (CD-ROM), Compact Disc-Re-Writable (CD-RW), Digital Video Disk-Read Only Memory (DVD-ROM).

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A telecommunication terminal comprising:
a local area network (LAN) port connectable to an enterprise computer network via an Ethernet cable;
an Internet Protocol (IP) phone unit;
a wireless access point unit that facilitates access to the enterprise computer network by wireless devices within a coverage area of the wireless access point unit by providing wireless connections to the wireless devices;
a switch device interposed between each of the IP phone unit and the wireless access point unit and the LAN port, wherein the IP phone unit and the wireless access point unit share the LAN port to access the enterprise computer network; and
a housing that encloses said IP phone unit, said wireless access point unit, said switch device and said LAN port, wherein said IP phone unit, said access point unit, said switch device and said LAN port are an integral part of the telecommunication terminal and contained within the housing.

2. The telecommunication terminal of claim 1, wherein said telephone unit and said wireless access point unit share a common power unit.

3. The telecommunication terminal of claim 1, wherein said switching device comprises one of a hub, a switch, a router or a gateway.

4. The telecommunication terminal of claim 1, further comprising a keypad and a display, wherein said keypad and said display are shared by said IP phone unit and said wireless access point unit.

5. The telecommunication terminal of claim 4, wherein said wireless access point unit is configurable through said keypad and said display.

6. The telecommunication terminal of claim 1, further comprising an antenna controller for adjusting the antenna power transmit level of said wireless access point unit.

7. The telecommunication terminal of claim 1, further comprising an antenna controller for adjusting beam-forming of said wireless access point unit.

* * * * *